United States Patent
Cherchali et al.

(10) Patent No.: US 8,526,424 B2
(45) Date of Patent: Sep. 3, 2013

(54) ENHANCING VOICE QOS OVER UNMANAGED BANDWIDTH LIMITED PACKET NETWORK

(75) Inventors: Ali M. Cherchali, Jackson, NJ (US); Marius Jonas Gudelis, Holmdel, NJ (US); William G. Lester, Cranford, NJ (US); Robert J. McLaughlin, Allentown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 792 days.

(21) Appl. No.: 12/386,148

(22) Filed: Apr. 14, 2009

(65) Prior Publication Data

US 2009/0201920 A1 Aug. 13, 2009

Related U.S. Application Data

(63) Continuation of application No. 10/411,533, filed on Apr. 10, 2003, now Pat. No. 7,613,282.

(51) Int. Cl.
*H04L 12/66* (2006.01)

(52) U.S. Cl.
USPC ........... 370/352; 370/353; 370/355; 370/356; 370/419; 370/463

(58) Field of Classification Search
USPC .................. 370/352–356, 463, 419
See application file for complete search history.

(56) References Cited

U.S. PATENT DOCUMENTS

| 6,747,995 | B1* | 6/2004 | Brown et al. | 370/493 |
| 6,970,909 | B2* | 11/2005 | Schulzrinne | 709/206 |
| 2003/0223461 | A1* | 12/2003 | Sharma et al. | 370/493 |
| 2004/0081176 | A1* | 4/2004 | Elwell et al. | 370/401 |
| 2004/0125819 | A1* | 7/2004 | Binder | 370/463 |

* cited by examiner

*Primary Examiner* — Asad Nawaz
*Assistant Examiner* — Khaled Kassim

(57) ABSTRACT

An improved telephony adapter compresses voice data, creates IP packets, and prioritizes the voice IP packets over the data IP packets. Preferably, the compression and packetization interval is such that the bandwidth occupied by the voice IP packets is approximately half of the minimum average available bandwidth in the upstream direction, thereby maintaining acceptable latency and voice quality of the speech. Further enhancement is achieved by causing the ISP to also give priority to voice packets that are destined to the telephony adapter, over the data packets that are destined to the telephony adapter.

6 Claims, 2 Drawing Sheets

ENHANCING VOICE QOS OVER UNMANAGED BANDWIDTH LIMITED PACKET NETWORK

RELATED APPLICATIONS

This application is a continuation of Application 10/411,533 filed in the United States Patent Office Apr. 10, 2003 which now bears U.S. Pat. No. 7,613,282.

BACKGROUND OF THE INVENTION

This invention relates to telecommunications over packet networks such as the Internet, and more particularly, to a method and apparatus for enhancing Quality of Service (QoS) for voice communication over such a network.

Once information is injected into the Internet, its worldwide movement is free, and that constitutes a powerful motivator to the creation of Internet telephony. Consequently, numerous techniques and various offerings are now available for IP telephony (VoIP). Products such as CoolTalk (Netscape), Internet Connection Phone (IBM), IPhone (Intel), NetMeeting (Microsoft), Quarterdeck WebTalk (Quarterdeck), TeleVox (Voxware), WebPhone (Netspeak), etc. are examples thereof.

FIG. 1 presents a block diagram of a telephony adapter 10 that may used to couple a POTS (Plain Old Telephone Service) telephone to the Internet. Adapter 10 comprises a telephony port 2 that is connected to interface card 11, and a number of data ports that apply IP packets that are received from digital appliances, such as computers, to input terminals of 14, which may be a switch or a router. Interface card 11 emulates the central office environment by providing the necessary DC current, off-hook detection, ringing signal generation means, etc. The analog signal that is received at port 2 in the course of a conversation, i.e., following a detected off-hook state and prior to a detected on-hook state, is converted to digital form in A/D/A bi-directional (analog-to-digital, and digital-to-analog) converter module 12, and applied to D/IP/D (digital-to-IP, and IP-to-digital) bi-directional converter module 13. The IP packets of module 13 are applied to another input terminal of element 14, which is a Layer 2 element whose output is applied to controller 15. Controller 15 also manages element 14.

Given that each port of element 14 can be coupled to a source of packets, and that some of the packet sources are computers that may run applications that, themselves, output more than one stream of IP packets, it follows that the channel from telephony adapter 10 to Internet Service Provider's (ISP) server 111 (upstream channel of link 20) can be quite in demand. Typically, however, an ISP offers a relatively narrow bandwidth to upstream channels because, at least in the past, users tended to download a lot more information than they tended to upload. This fact, as well as the technical limitations of most commonly deployed residential high-speed data networks, has led most ISPs to provide an asymmetrical service, with a broader downstream bandwidth and a narrower upstream bandwidth (for example, asymmetrical DSL, also known as ADSL).

Since the notion of dedicated facilities as in the conventional telephone network does not exist in packet networks such as the Internet, IP telephony presents a challenge because the transmission facility between a user and the Internet is of limited bandwidth. This challenge is particularly acute in the upstream direction because of the smaller bandwidth provided by the ISP in that direction.

SUMMARY

An advance in the art is realized with an improved telephony adapter that compresses voice data, creates IP packets, and prioritizes the voice IP packets over the data IP packets. Preferably, the compression and packetization interval is such that the bandwidth occupied by the voice IP packets is approximately half of the minimum average available bandwidth in the upstream direction, thereby maintaining acceptable latency and voice quality of the speech while leaving significant capacity available for data communication. Further enhancement is achieved by causing the ISP to also give priority to voice packets that arrive at the ISP and are destined to the telephony adapter, over the data packets that are destined to. the telephony adapter.

DETAILED DESCRIPTION

Figure 2:
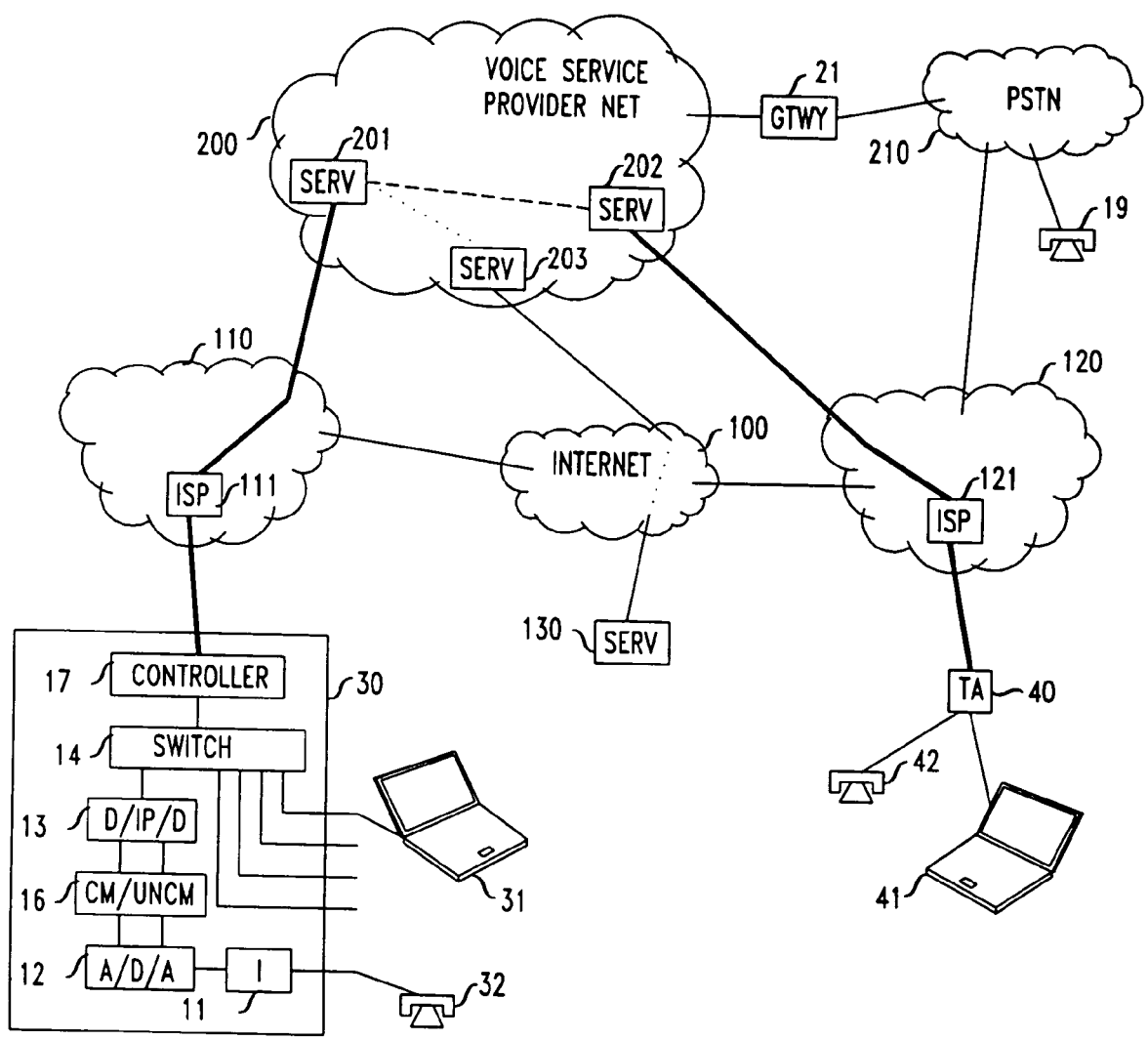
FIG. 2 presents a block diagram of an arrangement in accord with the principles disclosed herein.

FIG. 2 depicts an arrangement for providing both voice and data service to customers through an unmanaged packet network with an improved telephony adapter. In the context of this disclosure, an unmanaged network is a network that is not affirmatively known to be managed from the standpoint of prioritization of customer traffic (in contrast to network control traffic). Illustratively, FIG. 2 comprises unmanaged Internet network 100, and unmanaged IP networks 110 and 120. Networks 110 and 120 may be part of the Internet, but that is not a requirement of this invention. FIG. 2 also comprises voice service provider's network 200 and PSTN 210 that are connected to each other via gateway 21. Network 200 is characterized by an ability to provide voice-grade quality of service, although it may be wholly a packet network. Illustratively, network 200 is under control of an entity that ensures proper prioritization for voice packets (if network 200 also carries data packets) and that servers in network 200 include applications that, through interaction with IP phones, can establish connections among IP phones, and between IP phones and PSTN network 210 phones, such as telephone 19. In other words, network 200 belongs to an IP telephony provider.

Each customer that is connected to a packet network is connected to an ISP server, and those customers that seek to benefit from packet network telephony are connected to the network via a telephony adapter. Thus, FIG. 2 depicts one customer that employs telephony adapter 30 to connect computer 31 and telephone 32 to packet network 110 via server 111, and another customer that employs telephony adapted 40 to connect computer 41 and telephone 42 to network 120 via ISP server 121. Telephones 32 and 42 are POTS telephones.

TA 30 is a telephony adapter that is improved in accord with one aspect of this invention by interposing a speech compression module 16 between elements 12 and 13. Module 16 compresses the speech signal that is received from element 12, and uncompresses compressed speech signal that it receives from element 13. Module 16 may be constructed with a stored program controller microprocessor that implements speech compression in accordance with any selected speech compression algorithm. For various reasons, it is preferred to employ a standardized compression algorithm. For example, algorithms known as G.729, G.729e, G.729a/b, or G.726, with 20 ms packetization would be good choices. Of course, there is nothing particularly significant about the 20 ms length of the speech segments that are packetized, and other values will also work, for example, in the range of 5 to 50 ms. Our notion is that the compression and packetization interval should be such that the bandwidth occupied by the voice IP packets is approximately half of the minimum average available bandwidth in the upstream direction.

Figure 1:
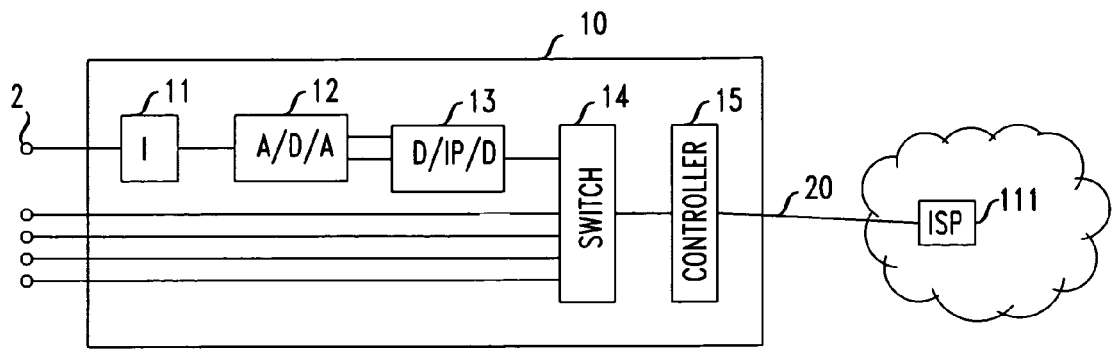
FIG. 1 presents a block diagram of a prior art telephony adapter.
Figure 3:
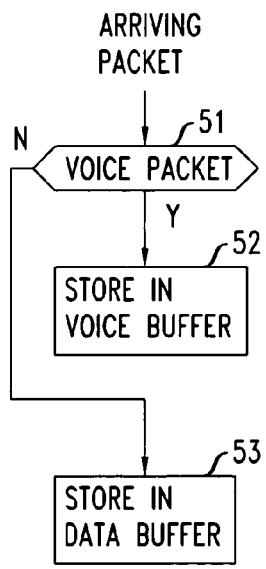
FIG. 3 is a flow chart of the prioritization performed on packets by controller.
Figure 4:
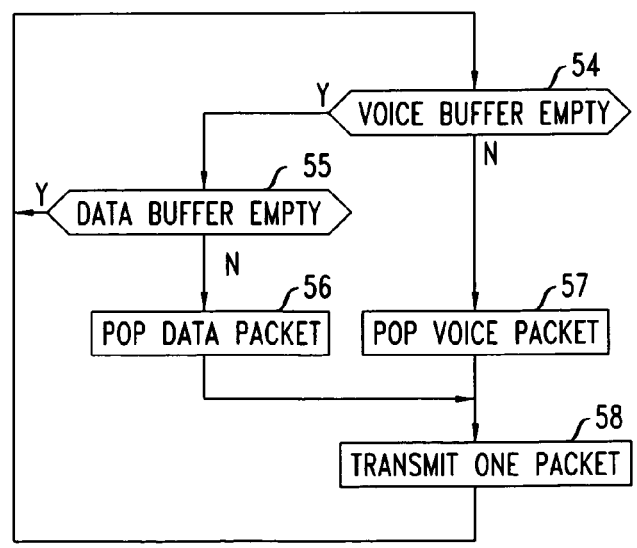
FIG. 4 presents a flow chart of a process carried out by controller 17 of FIG. 2.

TA 30 is also improved by incorporating a packet prioritization process within controller 17. Other than the packet prioritization, controller 17 may be identical to controller 15. Controller 17 exercises a prioritization process in connection with the transmission of packets that arrive from element 14, illustratively with two processes that operate concurrently, one of which is an event-driven process. The event driven process, shown in FIG. 3 is responsive to an incoming packet where, whenever a packet arrives at controller 17, step 51 determines whether the packet is a voice packet or a data packet. A voice packet is routed to step 52, which stores the packet in a FIFO voice buffer within controller 17, and a data packet is routed to step 53, which stores the packet in a FIFO data buffer within controller 17. Concurrently, controller 17 executes the process depicted in FIG. 4, where the aim of the process is to empty the voice buffer before emptying the data buffer. Accordingly, step 54 determines whether the voice buffer is empty. If it is, control passes to step 55, which determines whether the data buffer is empty. If it is, control returns to step 54. As soon as a packet is stored by the event-driven process of FIG. 3, either step 54, or step 55 determines that the voice buffer, or the data buffer (respectively) is not empty. If it is the data buffer that is not empty, control passes from step 55 to step 56, which outputs the oldest data packet from the voice buffer, and passes control to step 58. Step 58 transmits the presented packet. While the presented (data) packet is being transmitted, one or more data packets, and/or a voice packet, may arrive, which trigger the FIG. 3 process and populate the appropriate FIFO buffer within controller 17, as described above. When the telephone adapter services only a single telephone, and the data packets are not longer than the repetition rate of voice packets submitted to controller 17 (having period T), then only one voice packet may arrive while the data packet is being transmitted. When step 58 completes transmission of the data packet, control returns to step 54.

When step 54 encounters a non-empty voice buffer (holding a voice packet,—or more than one voice packet, if more than one telephone is being serviced, or the length of data packets comes greater than T) control passes to step 57, which outputs the oldest voice packet from the voice buffer, and passes control to step 58. While the voice packet is being transmitted, one or more data packets may arrive, which trigger the FIG. 3 process and populate the data FIFO buffer within controller 17. One or more other voice packets may also arrive (if the telephone adapter services more than one telephone). Actually, even when a single telephone is serviced, another voice packet may arrive if the length of a data packet is close to T (causing a delay in the transmission of the voice packet to a point where the next voice packet arrives before transmission of the current voice packet completes).

Hence, when transmission of the presented packet is completed in step 58 and control passes to step 54, it may happen that the voice buffer will be determined to be still not empty. According to the FIG. 4 process, the voice packets receive priority over the data packets, causing continued transmission of voice packets until the voice buffer is empty. Only then the transmission of the data packets proceeds, being interrupted, if necessary, by the intervening arrival and corresponding transmission of voice packets in the manner described above. Take the following example. Voice packets are approximately 100 Bytes in length (G.729e), arriving every 20 ms (T=20 ms). Ethernet packets are approximately 1500 Bytes in length. If the upstream bandwidth is limited to 128 Kbps, this equates to 128 Bytes/ms. The repetition rate of the voice packets leaves 20 ms for the data packets to be sent. The Ethernet packet of 1500 Bytes will take approximately 12 ms to be sent at the upstream rate, leaving time to spare before another voice packet arrives. Even if this interval is condensed because of a drop in upstream bandwidth and voice packets are delayed slightly behind each data packet, dynamic jitter buffers will serve to make this effect unnoticeable. Only if the upstream bandwidth shrinks to ~40 Kbps (30% of the 128 Kbps upstream rate) will the data stream be held-off completely in favor of the voice stream.

It may be noted that IP telephony can take place between telephone 32 and telephone 42 without assistance from other network elements, provided that address information of telephone 42 (IP address and port number) is available to controller 17 and address information of telephone 32 is made available to the controller within TA 40. TA 30 outputs to server 111 voice packets (of voice originating from telephone 32) that are addressed to the IP address of TA 40 and appropriate port number of telephone 42, and TA 40 outputs to server 121 voice packets (of voice originating from telephone 42) that are addressed to the IP address of TA 30 and appropriate port number of telephone 32.

The above disclosed apparatus and method address only the prioritization of packets from TA 30 to server 111; or to state more generally, from a TA to the IP packet network. Once packets enter server 111 and join the flow of packets from server 111 to network 110, there is no prioritization control (in the unmanaged networks). Even as voice packets enter server 121 and seek to enter TA 40, there is no prioritization of voice packets over data packets that are also destined to enter TA 40.

This latter condition may be readily changed, in accord with the principles disclosed herein without undertaking to convert the unmanaged networks into priority-managed networks. This is accomplished by adopting the FIG. 3 and FIG. 4 schema within each of the ISPs. Thus, as disclosed in FIG. 3, when packets arrive at server 111 that are destined to TA 30, they are stored in either a voice buffer or a data buffer, as the nature of the packets dictates. Concurrently, as disclosed in FIG. 4, packets are sent to TA 30 based on priority, always emptying the voice buffer within server 111 before attempting to empty the data buffer.

The above-described approach for carrying on a VoIP conversation between telephone 32 and other telephones without benefit of services provided by a voice-over-IP service provider is not favored because, for example, this approach requires TA 30 to know the destination addresses of all telephones that the user of the telephone that is connected to the TA might wish to be connected to. Because of this, and other reasons, IP telephony is moving in the direction depicted in FIG. 2, where a voice-over-IP (VOIP) provider is involved in the control of each IP call.

In such an arrangement, all TAs are provisioned to send their telephony control packets to a their specific server within network 200, such as server 201 for TA 30. When telephone 32 wishes to establish a VoIP connection, controller 17 responds to the off-hook signal of telephone 32 by sending an "off-hook" IP control packet to sever 201. This packet identifies the IP address of TA 30 and the port number by which telephone 32 can be reached by TA 30. Server 201 responds with the appropriate control packet, which is converted within TA 30 to a conventional dial tone that is applied to telephone 32. Telephone 32 proceeds with the conventional DTMF dialing signal, that signal is detected within the telephony adapter, and forwarded to server 201 in a telephony control packet; thus communicating the called party's number to server 201.

Server 201 maintains a database of telephone numbers. If the database look-up determines that the destination number is that of a telephone that is accessible via the PSTN, e.g. telephone 19, then server 201 interacts with gateway 21 and establishes a connection to telephone 19 via network 100 and PSTN 210. If, however, the database look-up determines that the destination number is that of a telephone connected to an IP network, for example, telephone 42, then server 201 retrieves the IP address of TA 40 and the port number of telephone 42, and sends an "alert" control packet to TA 40 via server 202. The alert packet causes telephone 42 to ring. When telephone 42 goes off hook, an "off-hook" control packet is sent to server 201 (via server 202), server 42 provides a control packet to TA 40 informing it of the IP address and port number of telephone 42, provides a control packet to TA 30 informing it of the IP address and port number of telephone 32, and withdraws from further interactions (until needed). The conversation between telephones 32 and 42 continues through direct communication; effectively in the same manner as it does in embodiments that do not employ the services of network 200.

What network 200 contributes, then, is the ability to easily establish connections among telephones; be it telephones that are connected to a TA, or telephones that are connected directly to PSTN 210. Still, while packets flow through networks 110, 100, and 120, there is no prioritization of voice packets over data packets. Moreover, there is no guarantee that the order of packets is maintained. Hence, even when there is both a voice packets flow and a data packets flow from TA 30 to TA 40, which is a situation that is likely to occur frequently, and a certain voice packet was sent out before a certain data packet, there is no assurance that the voice packet will arrive at telephone 42 before the data packet arrives at computer 41.

Being cognizant that networks 110, 100, and 120 are not managed and that telephones 42 and 32 can be separated by many nodes (particularly when these telephones are physically far apart (e.g., one phone in a hamlet of India, and the other phone in a hamlet of Missouri) and that, therefore, there are numerous opportunities for data packets to delay voice packets, it may make sense in some circumstances to force the voice connection between telephone 42 and telephone 32 to employ network 200 so that at least for some of the packets' journey they pass through a managed network that prioritizes voice packets over data packets. This can be accomplished by "IP tunneling," which is depicted in FIG. 3 by the bold lines between TA 30 and server 201, and TA 40 and server 202.

The above disclosure is couched in terms of a single telephone at a telephony adapter, and only one computer is depicted as being connected to each TA. It should be realized, however, that a single TA can concurrently service (support) a number of telephone instruments, as well as a number of digital appliances. Further, it should be realized that POTS telephone 32 may be replaced with an IP telephone that provides some of the functionalities that the disclosed TA provides. That would simplify the design of the TA. Still further, it should be realized that the IP telephone may be implemented, and effectively embedded, in a computer, such as computer 31. Also, the processes described in FIGS. 3 and 4 work independently, with the FIG. 3 process storing packets in the appropriate FIFO buffer as soon as they arrive. However, a single process can be easily formulated A skilled artisan should realize that different processes could be implemented without departing from the spirit and scope of this invention. For example, whereas the disclosed process always stores incoming packets, and then determines what ought, or can, be transmitted, an alternative process might store incoming data packets only if a packet is in the process of being transmitted.

We claim:
1. A telephone adapter that includes
an analog port;
a data port;
an output port that is configured to send packets to an internet service provider via an uplink of bandwidth attributes that are specified;
a first converter for developing digital signals from analog signals received at the analog port;
a second converter responsive to the digital signals for developing voice packets;
a controller for controlling flow of packets to the output port; and
a module for coupling the second converter and the data port to the controller, comprising:
a speech module interposed between the first converter and the second converter for performing a speech compression and a packetization of the digital signals; and
a priority-imposing module within the controller that is configured to:
accept the voice packets from the second converter and data packets from the data port;
output a voice packet to the output port when the voice packet is available to the priority-imposing module; and
output a data packet to the output port when the data packet is available to the priority-imposing module, but only if a voice packet is not available to the priority-imposing module,
where the speech compression and the packetization are configured to create a packets flow from the controller to the output port, wherein the packets flow has a bandwidth that is related in a predefined manner to the bandwidth attributes that are specified.

2. The telephone adapter of claim 1, where the predefined manner is a preselected fraction of an attribute of the bandwidth attributes that are specified.

3. The telephone adapter of claim 2, where the preselected fraction is approximately one half, and the attribute is an average minimum bandwidth.

4. An adapter comprising:
a processor of a controller; and
a computer readable medium in communication with the processor, to store a plurality of instructions which, when executed by the processor, cause the processor to perform operations, the operations comprising:
developing a digital signal corresponding to a received audio signal;

speech compressing and packetizing the digital signal to form audio packets corresponding to the received audio signal;
receiving data packets from a data source;
sending, in a prioritized manner, the audio packets and the data packets to an internet protocol packet network via a link of a specified average bandwidth, where
the prioritized manner is one where no data packets are sent as long as there are audio packets to be sent; and
the audio packets are developed by the speech compressing and packetizing at a rate that corresponds to a bandwidth that is not larger than a preselected fraction of a parameter of an average bandwidth that is specified.

5. The adapter of claim 4, where the preselected fraction is approximately one half of the average bandwidth that is specified.

6. The adapter of claim 5, where the average bandwidth that is specified is an average minimum bandwidth.

\* \* \* \* \*